Figures 7, 8, 9, 10:
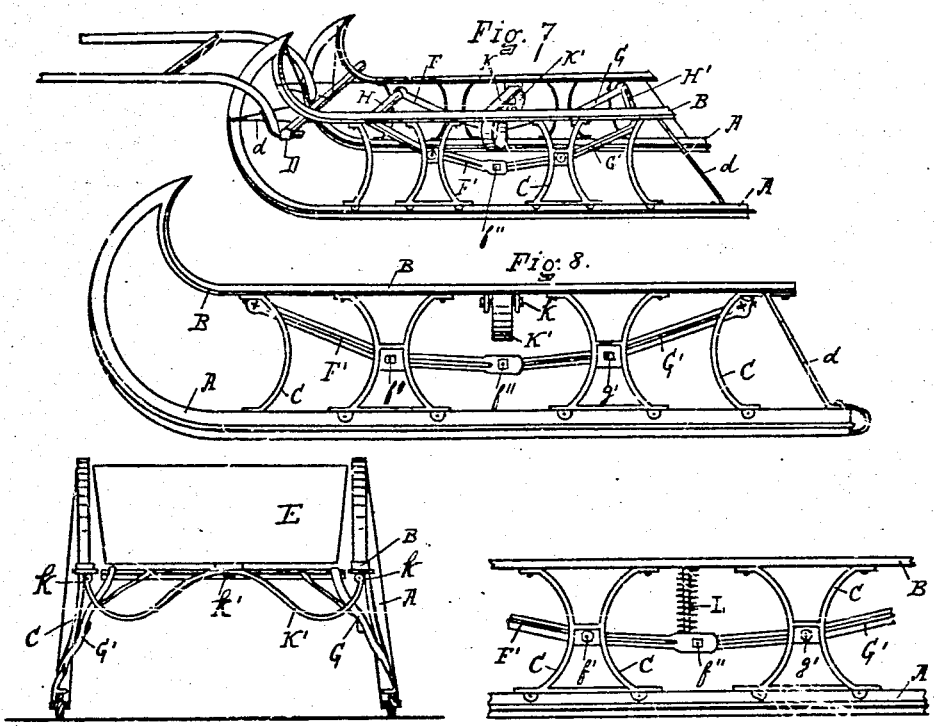

No. 851,819. PATENTED APR. 30, 1907.
DE WITT C. MARKHAM.
SPRING SLEIGH.
APPLICATION FILED MAY 4, 1904.
2 SHEETS—SHEET 1.
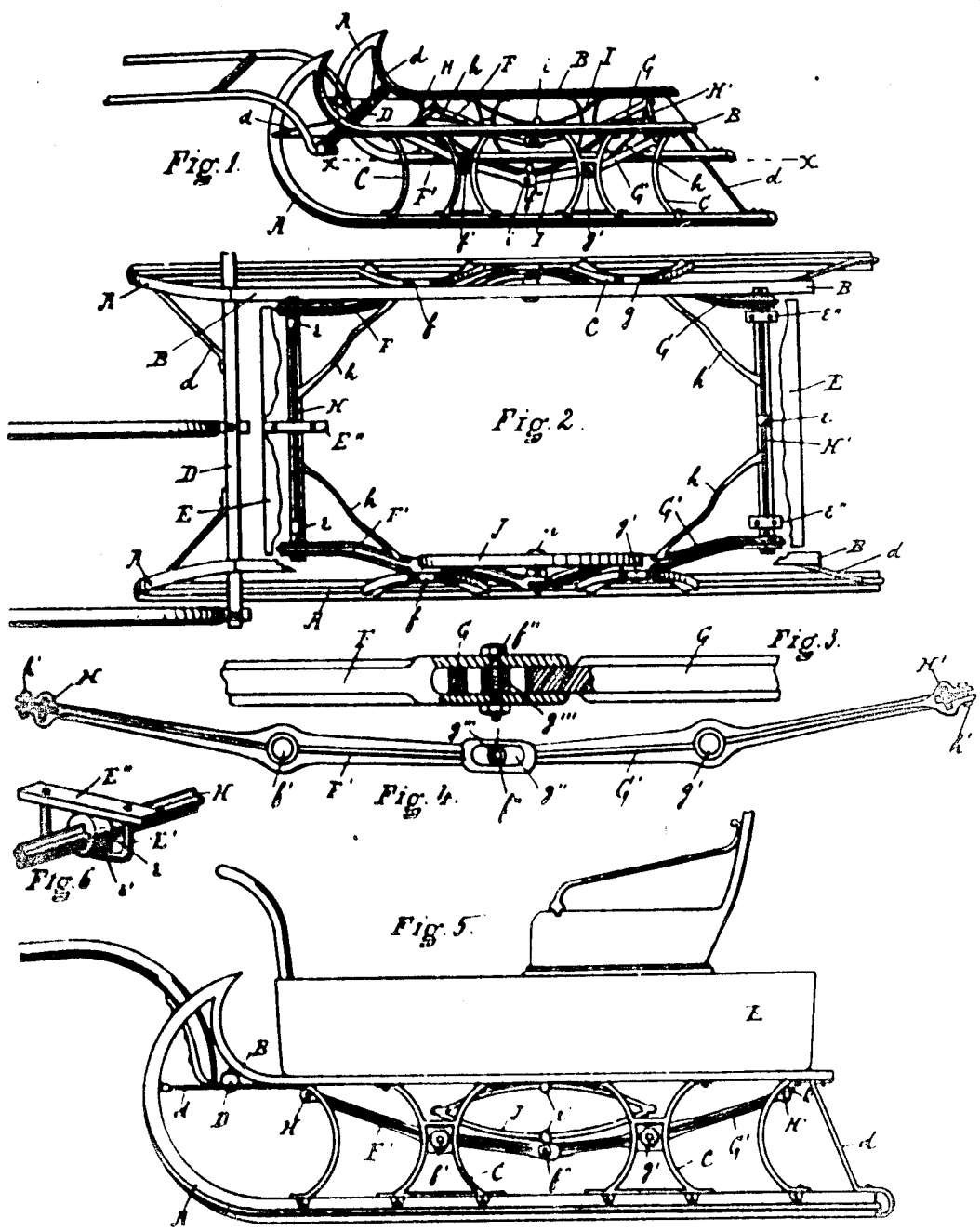
WITNESSES
Rich. A. George
E. P. De George
INVENTOR
DE WITT C. MARKHAM
BY Risley & Love
ATTORNEYS No. 851,819. PATENTED APR. 30, 1907.
DE WITT C. MARKHAM.
SPRING SLEIGH.
APPLICATION FILED MAY 4, 1904.

2 SHEETS—SHEET 2.

WITNESSES
Rich. A. George
E. P. DeGiorgi

INVENTOR
DE WITT C. MARKHAM
By Risley & Love
ATTORNEYS.

UNITED STATES PATENT OFFICE.

DE WITT C. MARKHAM, OF PORT LEYDEN, NEW YORK.

SPRING-SLEIGH.

No. 851,819.  Specification of Letters Patent.  Patented April 30, 1907.

Application filed May 4, 1904. Serial No. 206,264.

*To all whom it may concern:*

Be it known that I, DE WITT C. MARKHAM, a citizen of the United States, residing at Port Leyden, in the county of Lewis and State of New York, have invented certain new and useful Improvements in Spring-Sleighs, of which the following is a specification, reference being had therein to the accompanying drawings.

My invention relates to an improved spring sleigh, and I declare that the following is a full, clear, concise and exact description thereof, sufficient to enable one skilled in the art to make and use the same, reference being had to the accompanying drawings in which like letters and figures refer to like parts throughout.

My invention has to do with means whereby the box or platform of a sleigh may be given a spring movement and be equalized in its movement no matter at what point the pressure or load may be applied, and it consists of the different parts and construction and the form, arrangement and combination of the same as herein disclosed.

In the drawings Figure 1 is a perspective view of a pair of runners with equalizer and springs thereon. Fig. 2 is a plan view of the same, broken lines indicating parts removed, the knees & rave on one side being cut away on the line $x$—$x$ in Fig. 1. Fig. 3 is a partial section view of the connection between the equalizer bars, and Fig. 4 is a side view of the same with a small portion of one of them cut away. Fig. 5 is a side view showing a different spring. Fig. 6 is a perspective view of one of the mountings of the box on the equalizer frame. Fig. 7 is a perspective view with a different method of mounting and different spring. Fig. 8 is a side view of the same. Fig. 9 is an end view of the construction shown in Fig. 8 and Fig. 10 is a partial side view showing a different spring.

Referring to the figures more in detail, A illustrates the runners and B the raves of a sled, the same being supported by knees C the raves being connected across the front by bar D to which the draft is applied and the parts being suitably braced by rods $d$.

E represents the box or platform suitably supported as hereafter shown.

As is usual, the width between the raves is less than that between the runners and the knees are accordingly constructed to have an inward incline from the runners to the raves.

Upon the knees I pivotally mount an equalizer frame which is composed of bars F and F' which are similar in construction, G and G' which are also similar in construction, and the transverse bars H and H' and having the braces $h$. The side bars are pivotally mounted on the knees as shown at $f$ and $f'$, and $g$ and $g'$, the frame being mounted between the runners and raves. The adjacent ends of the said bars are pivotally connected, as particularly shown in Fig. 3, with inter-fitting parts, the end of bar G being shown as fitting in the forked end of F. Through the end F is passed the bolt $f''$. The end of bar G is formed with a slot $g''$, as shown in Fig. 4, wherein one of the forked portions of bar F is cut away. The bolt $f''$ carries a friction roller $g'''$ so that the bars G and G' can play freely on the bars F and F'. At the outer end each of the bars is cut out to receive the ends of the cross bars H and H' which are in cross section of the general form shown in Fig. 4. Beyond the opening formed in the side bars to receive the ends of the cross bars the side bars are extended and constructed to be clamped closely onto the cross bars by bolts and nuts $h'$ (Fig. 4). The side bars are to be given substantially the same webbed form in cross section as the cross bars. Of course, I do not limit myself to this form of bars or this style of connection, but they seem to me to be suitable and convenient for the purpose. The parts described when properly connected make an equalizer frame, pivotally supported on the knees, the adjacent side bars being pivotally connected at their inner ends so that the cross bars at the outer end of the side bars move in unison up and down, the whole frame having the necessary strength and rigidity.

The box or platform is mounted on the equalizer frame in a manner which permits the play of the frame in its bearing on the box or platform. In the present case I illustrate this as accomplished by a single mounting at the forward end of the box or platform, the parts of which are particularly shown in Fig. 6 wherein E' illustrates a clip which is securely mounted on the box or platform, either directly or by means of a plate E'' secured thereon. This particular mounting has the clip E' elongated so as to give freedom for the equalizer to play horizontally on the box as the cross bars rise or fall. The cross bar is provided with a collar $e$, which is provided with groove $e'$ to receive the clip $E'$, and give a proper contact surface or bearing on the platform or box structure, and also to prevent side play of the box on the frame. At the rear I have two mountings at the points $e''$, which are substantially like the one already shown, except that clip $E'$ is not extended to permit play, the intention being to have the mountings fixed against horizontal movement of the box on the frame but permit free up and down movement together. Similar collars are elsewhere provided to give sufficient bearing of the box on the frame.

The normal condition is that the outer ends of the equalizer frames should be in elevated position, and to maintain this I provide springs, and illustrate different kinds of the same. In Fig. 1 I illustrate a curved spring I, there being one for each series of side bars. The outer or free ends of the spring are seated to play on the under side of the raves, the intermediate part being seated on the side bars and secured thereon between clips $i$. In Figs. 2 and 5 I show a diamond spring J. In Fig. 2 it does not appear on one side but is shown in part on the other side where the rave has been cut away. This spring is mounted intermediate of the ends between the clips $i$ on the side bar and clips $i'$ on the raves as shown in Fig. 5. Where the spring is shown in Fig. 2 the lower part does not appear, it being omitted to show the mounting of the connection between the side bars. In Figs. 7, 8 and 9 is illustrated a different spring which is also differently mounted. K is a sleeper or cross bar which is secured to the underside of the box or platform. The spring K' has the general form shown in those figures and is pivotally supported on the raves by clips $k$ and is secured to the bar K at its central part as illustrated at $k'$. Fig. 10 shows a further variety of spring, L, which consists of a coil secured at one end underneath the rave and at the other end on the side bars. The purpose of each style of spring is readily understood to form resistance or support to the load which by means of the equalizer is suitably distributed.

Having described my invention, what I claim as new, and desire to secure by Letters Patent, is—

1. In a spring vehicle, the combination with the running parts and a load support, of a frame comprising lever members pivotally mounted on the running parts and extending front and rear for the even support of the load, and spring means transverse the central part of the load support and supporting it on the running parts by attachment of the spring means to the running parts and to the load support.

2. In a spring sleigh having a load support, running parts and a single transverse spring attached to the latter and supporting the former thereon, the combination of a set of equalizer bars on each side of the running parts, each set comprising bars pivotally mounted on the running parts and slidably and pivotally connected at their inner ends and transverse bars connecting the outer ends of each set to support the load and permit its free up and down motion, substantially as described.

3. In a construction of the character described having a load support, running means and a single transverse spring attached to the load support and the running means, the combination of an equalizer frame having members pivotally mounted on the running means on each side of the structure and connected at their outer ends to form a frame rigid from side to side and having its said ends moving up and down simultaneously, substantially as described.

4. In a spring vehicle, the combination with running and load supporting means, of a spring connection between the two, and an equalizer frame comprising bars pivotally mounted on the running means and supporting the load both front and rear of the said spring means and being connected to the load support at one end with an elongated bearing permitting reciprocal movement of the adjacent end of the frame and the load supporting member.

5. In a spring vehicle, the combination with running means, of a load supporting means, an equalizer frame of parallelogrammic form comprising side bars pivotally mounted on the running means and slidingly pivotally connected each to the other at the inner end and loosely supporting at their outer ends the load supporting means to permit reciprocal play of the load supporting means and one end of said frame thereunder.

6. In a spring vehicle, the combination with running means, of a load supporting means, an equalizer frame of parallelogrammic form comprising side bars pivotally mounted on the running means and slidingly pivotally connected each to the other at the inner end and loosely supporting at their outer ends the load supporting means.

7. In a sleigh, runners and raves connected by means of knees, with equalizer bars hinged between the runners and the raves so as to work freely up and down, a load platform pivotally supported by the bars, and a spring hinged to the raves and secured to the platform in such a manner as will allow of a free up and down motion.

8. In a vehicle provided with a load support and running members and having the spring support of the former on the latter, a frame comprising bars pivoted on the running members with their adjacent ends pivotally connected and their outer ends provided to carry the load support, one of said bearing ends of the frame having a sliding connection with the load supporting member.

9. In a construction of the character described provided with running parts and a load platform, an equalizer frame having a plurality of transverse members for supporting the load platform, and spring means transverse of the platform midway of its length supporting the platform through connection of the spring therewith and by the connection of the spring at its ends to the running parts, substantially as shown.

10. In a construction of the character described comprising a load platform and running parts, spring means mounted to support the former relatively to the latter, and lever members pivotally mounted on the latter and slidingly connected at their adjacent ends and being at their outer ends adapted to support the platform.

11. In a construction such as described, the combination with running means and a load supporting means, of an equalizer frame of parallelogrammic form comprising pivotally mounted side bars slidingly pivotally connected to co-operate and supporting at their outer ends the load platform by means of a sliding connection between the frame and the platform to permit play of the latter.

In testimony whereof I affix my signature in presence of two witnesses.

DE WITT C. MARKHAM.

Witnesses:
FRED D. MARKHAM,
HOMER C. MARKHAM.